US005601433A

United States Patent [19]
Potter

[11] Patent Number: 5,601,433
[45] Date of Patent: Feb. 11, 1997

[54] EARTHQUAKE TOY, EDUCATIONAL DEVICE OR THE LIKE

[76] Inventor: Kenyon D. Potter, 3042 Steiner St., San Francisco, Calif. 94123

[21] Appl. No.: 236,577

[22] Filed: May 2, 1994

[51] Int. Cl.⁶ .......................... G09B 19/26; G09B 23/08
[52] U.S. Cl. ............................................. 434/130; 434/302
[58] Field of Search ................... 446/3; 434/130, 434/150, 299, 300, 302, 55, 59, 30; 366/128; 73/667, 666, 668, 663, 672

[56] References Cited

U.S. PATENT DOCUMENTS

| | | | |
|---|---|---|---|
| 1,752,266 | 3/1930 | Sloan | 366/128 |
| 1,879,923 | 9/1932 | Deirter | 366/128 |
| 2,305,783 | 12/1942 | Heymann et al. | 73/667 |
| 2,500,293 | 3/1950 | O'Connor | 366/128 |
| 2,725,745 | 12/1955 | Hubbard et al. | 73/667 |
| 3,196,580 | 7/1965 | Rakestraw | 446/3 |
| 3,399,857 | 9/1968 | Schultz | 73/666 |
| 3,649,018 | 3/1972 | Beam | 273/95 A |
| 3,945,246 | 3/1976 | Wadenrten | 73/666 |
| 3,984,924 | 10/1976 | Myles et al. | 434/55 |
| 4,112,776 | 9/1978 | Ouelletto et al. | 73/665 |
| 4,343,475 | 8/1982 | Stader | 273/276 |
| 4,358,276 | 11/1982 | Ehrlich | 434/302 |
| 4,448,416 | 5/1984 | Belter | 273/110 |
| 4,463,946 | 8/1984 | Wallace et al. | 272/111 |
| 4,513,402 | 4/1985 | Devaeire . | |
| 4,536,167 | 8/1985 | Hughes | 446/396 |
| 4,787,631 | 11/1988 | Erumsele | 273/1 |
| 5,009,412 | 4/1991 | Roodenburg et al. . | |
| 5,066,136 | 11/1991 | Johnson | 366/209 |
| 5,088,949 | 2/1992 | Atkinsen et al. | 446/3 |
| 5,099,826 | 3/1992 | Hayakawa | 128/36 |
| 5,187,982 | 2/1993 | Chu | 73/667 |
| 5,192,212 | 3/1993 | Kim | 434/302 |

FOREIGN PATENT DOCUMENTS

| 400455 | 8/1991 | Germany | A63B 22/16 |
|---|---|---|---|
| 190876 | 8/1986 | United Kingdom | A63F 9/00 |

OTHER PUBLICATIONS

Rea, D. and J. Penzien. "Dynamic Response of a 20 ft × 20 ft Shaking Table" Proceedings of the 5th World Conference on Earthquake Engineering, Rome, Italy, 1973.

Caccese, V. and H. G. Harris. "Earthquake Simulation Testing of Small–Scale Reinforced Concrete Structures" ACI Structural Journal, Jan./Feb. 1990, pp. 72–79.

Tomazevic, M. and T. Velechovsky. "Some Aspects of Testing Small–Scale Masonry Building Models on Simple Earthquake Simulators" Earthquake Engineering and Structural Dynamics. vol. 21. 1992. pp. 945–963.

"NBS Simulates Earthquake" Engineering News Record. Jul. 17, 1986. p. 13.

Schrage, Micheal. "State, Federal Governments Need Shaking Up." Innovation. San Francisco Examiner, Jan. 30, 1994, p. E14.

(List continued on next page.)

*Primary Examiner*—William E. Stoll
*Assistant Examiner*—Michael O'Neill
*Attorney, Agent, or Firm*—Joseph C. Mason, Jr.; Mason & Associates, P.A.

[57] ABSTRACT

An educational device for simulating the effects of earthquakes includes a table supported above a base by a plurality of coiled springs or other flexible and resilient members. A slot formed in the table coincident with a longitudinal axis of symmetry of the table accommodates a flywheel having a radially extending slot within which is mounted a weight member at any preselected location along the extent of the slot. A battery-operated variable speed motor strapped to the table has an output shaft to which the flywheel is coupled, and a control knob enables a user to vary the speed of rotation of the output shaft and therefore of the flywheel. The intensity of the vibration of the table is varied by moving the weight member along the extent of the radially extending slot. Alternative embodiments include a weight member having a fixed, immovable eccentric position and a balanced flywheel that is mounted eccentrically relative to the output shaft of the motor.

14 Claims, 5 Drawing Sheets

OTHER PUBLICATIONS

Environmental Volunteers, Palo Alto, California. "Plans for the Teaching Materials: Red–Brown Box— Shaking Table" Report to the Federal Emergency Management Agency under an Earthquake Education Grant. 1989–90. Contact: Marilyn MacCabe, FEMA, (202)–646–2812.

Environmental Volunteers, Palo Alto, California. "Hands-On Earthquake Learning Package." Edited by K. E. K. Ross. Fourth Edition of Earthquake Education Materials for Grades K–12, National Center for Earthquake Engineering Research, Suny, Buffalo, New York, pp. 3–7.

Isham, J. Technical Coordinator. Earthquake Room: Nature's Fury. Oregon Museum of Science and Industry. 1989(90).

Ross, K. E. K. "Using Shake Tables in the Pre–College Classroom: Making the Impact of Earthquake Come Alive." Proceedings of the 1993 National Earthquake Conference. vol. I Memphis, Tenn. pp. 423–429.

Santilli, C. "Kids for Architecture: Concerned Architects and engineers are Inspiring a New Generation of Construction Professionals." The Construction Specifier. Sept./Oct. 1993. pp. 76–91.

"Big Shakeup at Bristol." (Contact: Prof. Roy Severn, Programme Coordinator, Bristol University, England. 1985.

Laboratory Equipment Catalog 93–1. Gilson Company, Inc. Item HM–140. p. 81.

EARTHQUAKE TOY, EDUCATIONAL DEVICE OR THE LIKE

BACKGROUND OF THE INVENTION

1. Field of Invention

This invention relates to mechanical toys and educational devices, specifically to such toys and educational devices which are used for the simulation of earthquake ground shaking and potential damage or destruction of buildings and other structures.

2. Description of the Prior Art

Researchers in the world's major structural engineering laboratories frequently use large-scale shaker tables to perform earthquake studies and investigations. Shaker tables are also, but much less frequently, used by museum curators and science educators to provide an educational device for demonstrating concepts relating to earthquakes and for motivating students about earth science.

Originally, shaker tables were constructed as permanent installations in research laboratories. Such tables reproduce earthquake ground shaking motion for testing scale models of buildings and structures. Typically, tables in these laboratories are controlled by digital computers and driven by hydraulic actuators which enable researchers to meet the requirements of their earthquake studies. However, most non-researchers, including educators, cannot utilize these laboratory-based shaker tables because of their scarcity and their permanent nature. For example, the museum at the California Academy of Sciences possesses one of the very few such shaker tables outside of a research laboratory.

Thereafter, inventors created several types of shaker tables to reproduce or simulate earthquake ground motion without the necessity of permanent installations. The Oregon Museum of Science and Industry has developed shaker tables which can be relocated as part of a traveling earthquake exhibit; however, these tables require substantial set-up time and special facilities, including a continuous supply of compressed air for operation and motor vehicle accessibility for loading and transportation. Hence, these tables are not suitable for home or classroom use but are limited to use in assembly areas or special locations having the requisite facilities.

Environmental Volunteers of Palo Alto, Calif. developed a shaker table which can be relocated by one person and provides greater portability; however, the underlying mechanism of this table has an excessive number of machined parts which require custom manufacture. Thus, the table is cost prohibitive for home or educational use. This critical failing is borne out by the fact that previous manufacturers of this type of shaker table have scaled back or discontinued their production.

Several types of more economical shaker tables have been proposed; for example, Katharyn Ross, a researcher at the National Center for Earthquake Engineering Research, has put together a table using common materials. Her shaker table took the form of a cardboard table suspended by rubber bands from an exterior cardboard box frame. Ross tested it in a classroom setting albeit with limited effectiveness. Although portable and inexpensive to craft, said shaker table lacks the durability demanded for extended or repetitive use and the flexibility for varied modes of use. For instance, the table's rubber bands must be replaced often and the table's user cannot achieve a specific frequency of vibration which is essential to demonstrate the effects of earthquake motion on objects.

Shaker tables have been used for more than earthquake simulation. In addition, these tables were used to generate vibration for consolidating mixtures, such as concrete, and for aiding in sorting of materials, including food, medicine or grain products. However, in the mixing and sorting applications, the shaker table's intended use, internal mechanism, and vibrational characteristics do not coincide with those necessary for earthquake simulation.

The use of such shaker tables does not allow for users to mount the objects for subjection to earthquake-type shaking. Their shaking mechanisms are generally rotating cams which produce a motion of relatively high frequency. These vibrations are required to achieve reduction of inter-particulate surface friction in mixing and sorting. However, such vibrations are much higher in frequency than acceptable shaking motion for earthquake simulation.

All the shaker tables of the types heretofore mentioned suffer from several of the following known disadvantages:

(a) Tables of the type in present use generally are made of custom machined parts or components which result in tables which are prohibitively expensive for home or educational use.

(b) Tables of the type in present use rely on methods of joining or assembling parts which do not lend themselves to mass manufacture.

(c) Tables of the type in present use which have operating mechanisms using elastic rubber bands for table support generally are unreliable.

(d) Tables of the type in present use made of typical construction materials like steel and concrete do not end themselves to economical modification or improvements.

(e) Tables of the type in present use do not lend themselves to rapid setup and mounting of objects.

(f) Tables of the type in present use are not sufficiently portable nor lightweight to permit carrying in a hand-held case.

(g) Tables of the type in present use require external hydraulic, compressed air or electrical power sources which may not be readily available and which may represent a safety hazard in home or educational settings.

SUMMARY OF THE INVENTION

The longstanding but heretofore unfulfilled need for a shaker table not subject to the limitations of earlier devices in the field of this invention is met by a novel structure that includes a flat base, a flat table, a plurality of flexible and resilient support means for supporting said flat table above said flat base in vertically spaced relation thereto, a slot formed in the flat table, a motor mounted on said flat table adjacent said slot, said motor having a rotatable output shaft, a flywheel mounted to said output shaft, and a radially movable weight means mounted to said flywheel. The flywheel is positioned in the slot so that is unbalanced rotation is transmitted to the table to simulate an earthquake when the output shaft is rotated at a predetermined frequency.

Accordingly, several objects and advantages of the present invention are:

(a) to provide a shaker table which minimizes the number of parts which require custom fabrication so that the table is inexpensive for home or educational use;

(b) to provide a shaker table which uses joining or assembly methods which lend themselves to mass manufacture or end user assembly;

(c) to provide a shaker table which is reliable in addition to being economical;

(d) to provide a shaker table whose structure may be readily modified and improved or easily complemented by accessories;

(e) to provide a shaker table which can be rapidly set up and onto which objects can be rapidly mounted;

(f) to provide a shaker table which is portable and sufficiently lightweight to be carried in a hand-held case (g) to provide a shaker table that is powered by a self-contained power supply or hand operated to enable use in any setting.

Further objects and advantages are to provide a shaker table which can be used repetitively to simulate earthquake ground shaking or easily, conveniently and effectively to demonstrate earthquake shaking motion and the imparted shaking of buildings, structures, objects, etc.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the preferred embodiment, table 10 is a rigid composite board consisting of an inner foam core and outer paper laminates, such as foam board available from Hunt Manufacturing Co., Statesville, N.C. However, the table can consist of any other material that is rigid and lightweight such as molded thermoplastic, expanded sheet metal, corrugated cardboard, fiberboard, various foam-filled or stiffened panels, various membranes stretched across a rigid frame, etc. Like the table, base 30 can consist of any material that is rigid; however, the base can have any weight because base weight 36 performs the function of holding the toy or device stationary.

The typical toy or device has four flexible support members 32 disposed between table 10 and base 30 whereby the table and the base are vertically spaced apart. The first end of each support is firmly connected with a binder clip 34 to the underside edge of table 10 and the second end of each support is similarly firmly connected with a binder clip 34 to the topside edge of base 30. In the preferred embodiment, each support is a coil spring of roughly 4 cm to 5 cm in length having 10 to 20 turns and made of 24 to 30 gage wire. Thus, each coil spring is connected to the underside and topside, respectively, of the table and the base.

Motor 20 is mounted on the top or bottom side of the table adjacent to an edge of the table so that the orientation of the motor shaft 22 is parallel with the edge. The motor is mounted firmly to the table with a friction pad, not shown, between motor and table and held with plastic lock ties 16 that overlie the motor and which extend through mounting holes 18 and are securely interlocked on the side of the table opposite the motor. A flywheel 24 is bonded to the end of motor shaft 22. A bolt 28 is inserted through a radial slot 26 in the flywheel and fastened with a nut 29. The radial slot allows for adjustment of the bolt and the nut.

The table 10 of the toy is typically 5 mm to 20 mm in thickness, and has overall dimensions ranging from 15 cm×15 cm (square shape) to 50 cm×100 cm (oblong shape). Base 30 is typically of the same thickness and with similar lateral dimensions except that one dimension is extended 5 cm beyond the extent of the table to provide space for a motor controller subassembly 40 and a battery holder 38.

A cutout or slot 12 of roughly 3 cm in width by 6 cm in length is formed in an edge of table 10 to provide vertical clearance for flywheel 24.

Figure 6:
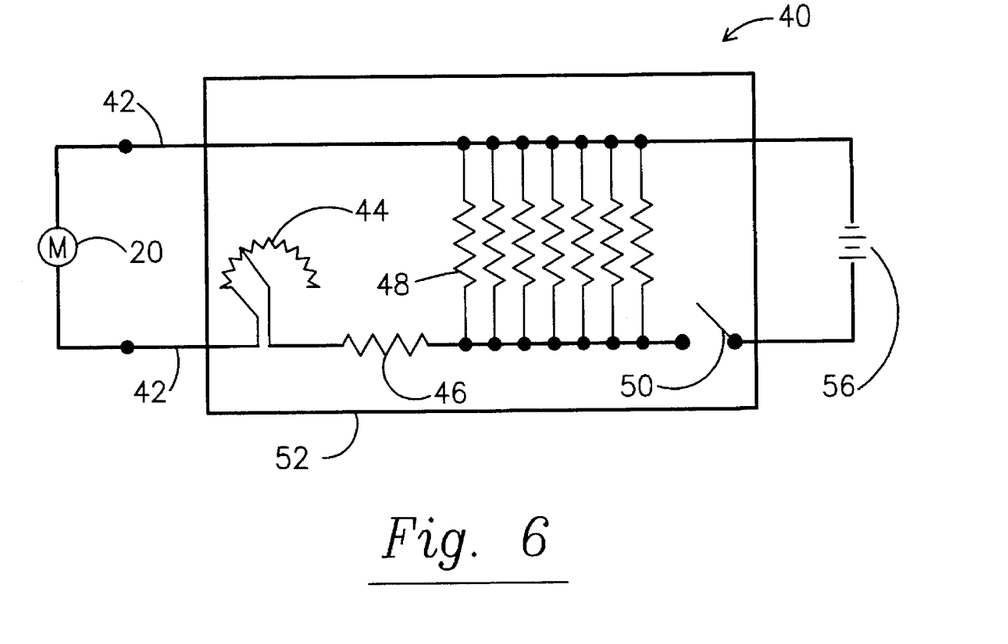
FIG. 6 is a wiring diagram depicting the preferred electrical wiring for controlling operation of the device.

Motor controller subassembly 40 includes a 0 Ohms to 5K Ohms potentiometer 44, a 10-Ohm resistor 46 and a slider switch 50 electrically connected in series to the motor and a battery holder 38 which holds batteries 56. The motor controller also includes seven 10K-Ohm resistors 48 electrically connected in parallel to the motor and 10-Ohm resistor 46. The components of the subassembly described above are wired on a breadboard 52. The components are interconnected by insulated wire which is soldered to components. The motor controller subassembly is mounted to the base with screw fasteners 54. Finally, wire leads 42 connect the subassembly to the electrical contacts on the motor.

Object mounting tabs 62 are arranged on the top of the table to receive an object 60. In the preferred embodiment, the tabs are double-sided adhesive tape.

The table may be modified by adding a table overlay, not shown, on top of table 10 by firmly fastening the overlay to the table with binder clips 34 to connect said table overlay to the table at its edges. The table overlay can resemble an urban or rural geographical terrain or the interior plan of a building or other structure.

There are various possible variations with regard to the base in the preferred embodiment of this invention. Alternatively, the base can be weighted itself and base weight 36 may be omitted. In general, the base may be any article of furniture, counter or platform which is rigid and approximately level provided that large capacity binder clips or C-clamps are used.

From the description above, a number of advantages of my shaker table become evident:

(a) the required parts are inexpensive, off-the-shelf components and fabrication is limited to cutting out the table and the base and punching the slot in the flywheel all of which are made from readily available materials.

(b) all the parts may be joined or assembled by hand and tightened with hand tools except for the motor controller assembly which requires soldered connections between its parts;

(c) all the parts are durable and have firm connections so that the device is reliable in addition to being economical;

(d) the table may be readily modified for play or lesson by overlaying with a terrain simulating accessory;

(e) objects can be rapidly mounted and dismounted from the top of the table using the object mounting tabs;

(f) the present invention is portable if placed into a carrying case and is sufficiently lightweight to be carried easily;

(g) the power supply is self-contained and the present invention may be hand-operated which does not limit use of the present invention in any setting.

Figure 1:
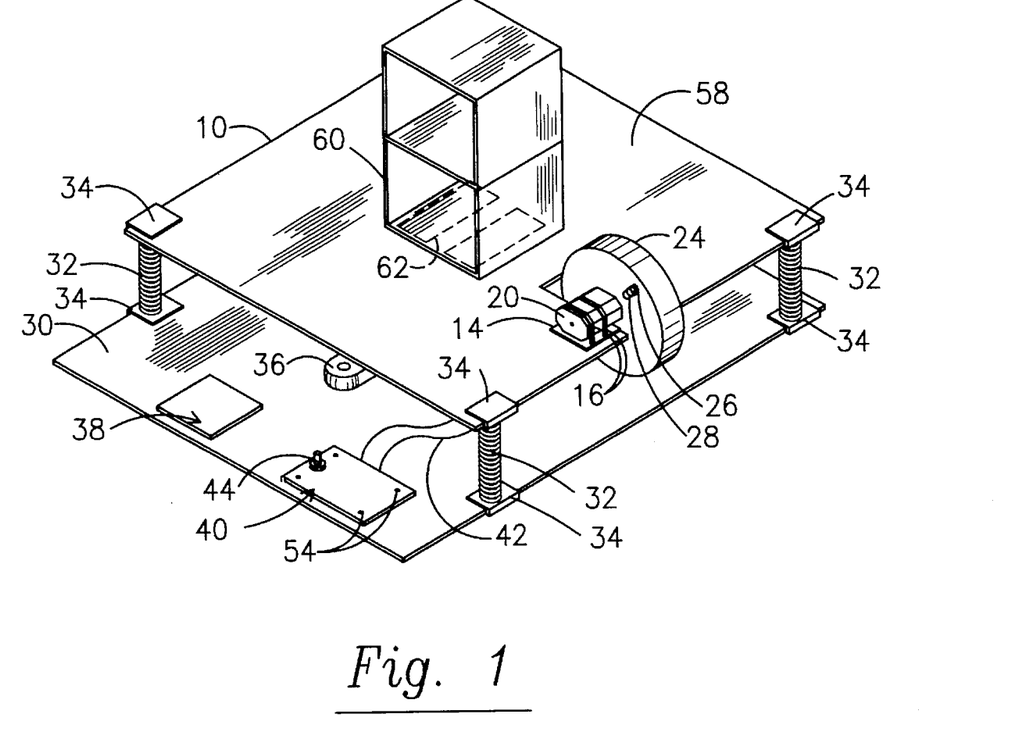
FIG. 1 is a perspective view of an exemplary embodiment of the present invention.
Figure 2:
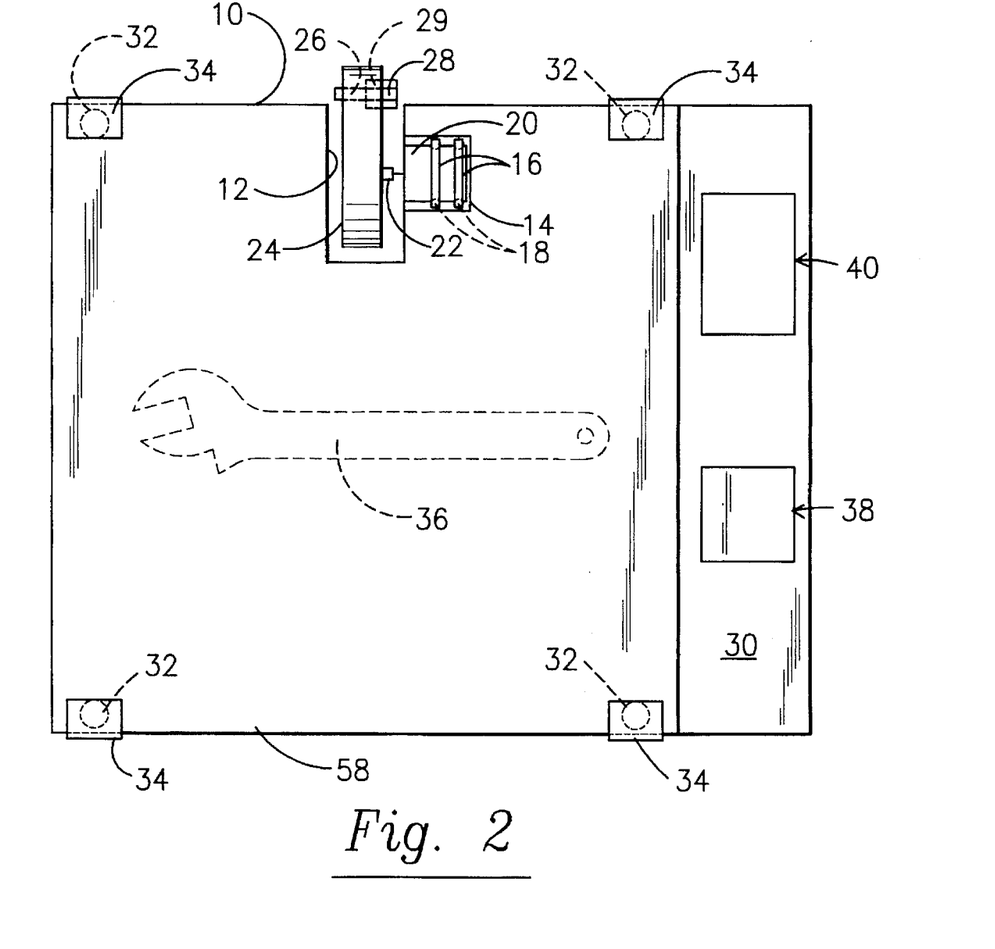
FIG. 2 is a top plan view thereof.
Figure 3:
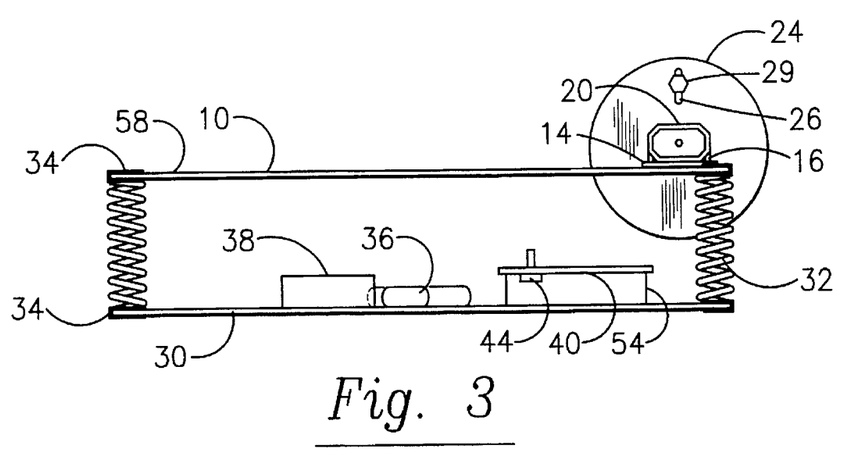
FIG. 3 is a front elevational view thereof when the device is in repose.
Figure 4:
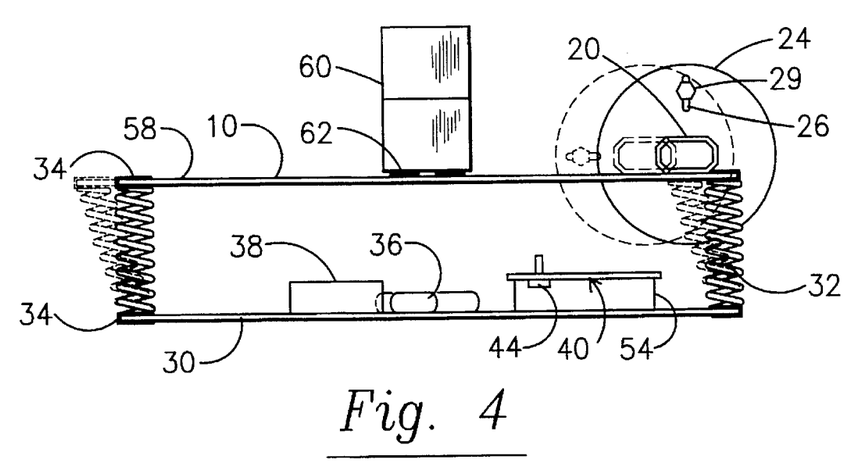
FIG. 4 is a front elevational view thereof when the device is undergoing vibration.
Figure 5:
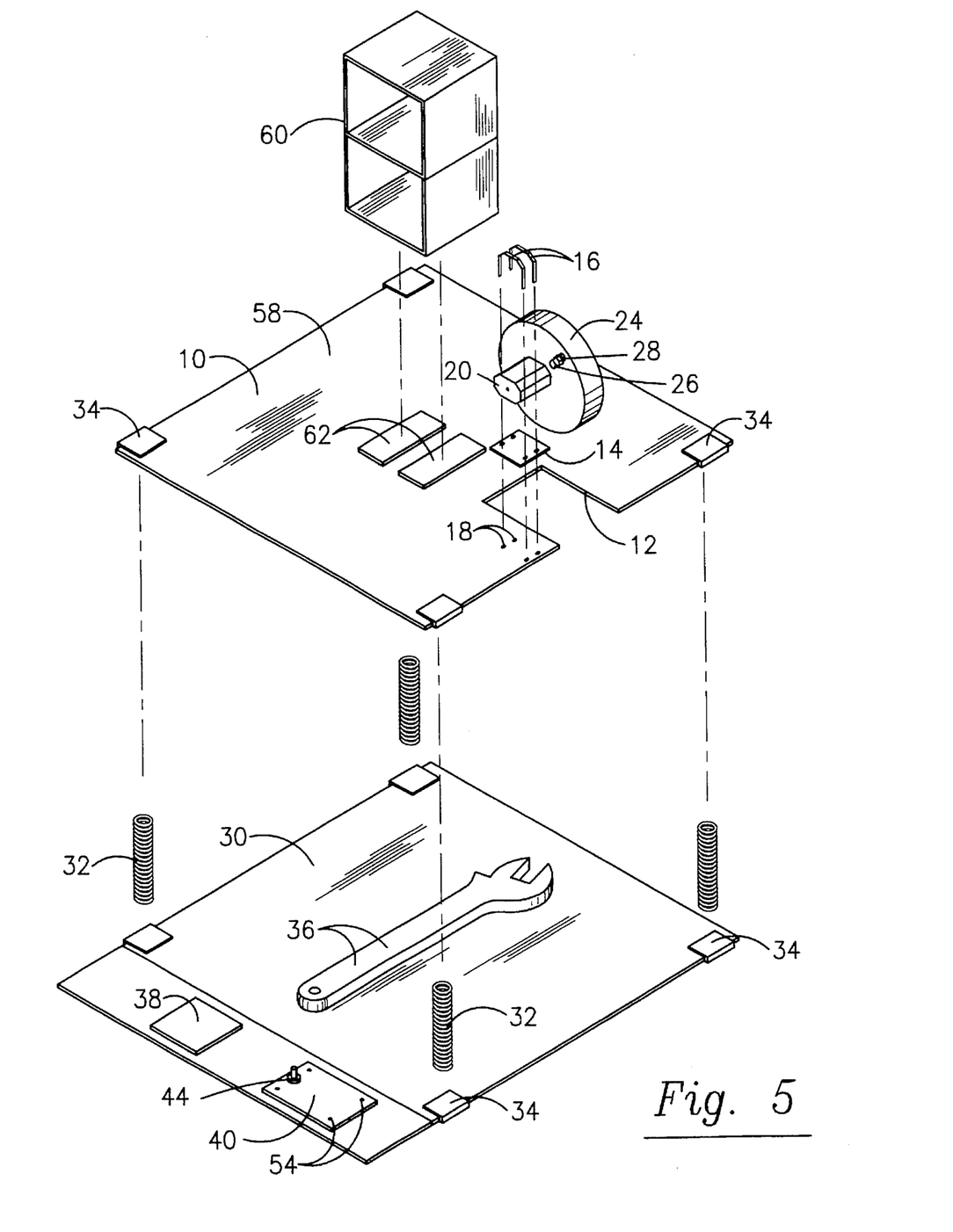
FIG. 5 is an exploded perspective view of the exemplary embodiment.

Operation—FIGS 4 to 5

The present invention is set on a level surface and is held in place by friction between base 30 and any article of furniture, counter or platform. Base weight 36 is placed on the base to provide ample friction. Bolt 28 and nut 29 serve the function of an unbalanced mass which imparts inertial forces to the table.

Object 60 is placed or mounted on the top of table 10 using object mounting tabs 62.

Batteries 56 are installed and the slider switch is switched on. Potentiometer 44 is adjusted to control the frequency of motor 20 which in turn regulates the frequency of lateral table shaking or sidesway. The shaking motion may continue for a finite time or depending on intended play or educational use. The shaking motion may or may not cause the object to topple or fall apart.

To interchange objects the slider switch is turned off and the object is dismounted from the table top and replaced with a new object.

After operation of the present invention, the slider switch is turned off to conserve power and the base weight is removed from the base.

Accordingly the reader will see that the shaker table of this invention can be easily and conveniently used in earthquake play, earthquake-related demonstrations or in general to shake objects. In addition, this invention has the capacity for home or educational use and is highly portable for use in various settings. Furthermore, this invention has additional advantages in that:

it permits use of off-the-shelf components;

it permits the end user to easily assemble the parts;

it allows rough play or use due to its reliability;

it permits placing or mounting of objects on top of table;

it provides self-contained or hand-operated power to cause shaking motion;

Although the description above contains many specificities, these should not be construed as limiting the scope of the invention but as merely providing illustrations of some of the presently preferred embodiments of this invention. For example, the shaker table can have other sizes; shapes, such as, triangular, circular, oval, trapezoidal, etc.; and surfaces, such as, non-level, non-planar, sloped, rough terrain, etc. The motor and flywheel can be oriented differently or located off the table and shake the table by means of a connecting arm to the table.

Thus the scope of the invention should be determined by the appended claims and their legal equivalents, rather than by the examples given.

I claim:

1. An educational device for simulating earthquakes, comprising:

a flat base;

a flat table disposed above said flat base in vertically spaced relation thereto;

at least one flexible and resilient spring means disposed in interconnecting relation between said flat base and said flat table;

a first clamping means for connecting a first end of said spring means to said flat base and a second clamping means for clamping a second end of said spring means to said flat table;

each of said first and second clamping means being a "U"-shaped clip that respectively engages said flat base and said flat table;

said first end of said spring means being secured to a top side of said clip engaged to said flat base and said second end of said spring means being secured to a bottom side of said clip engaged to said flat table.

2. An educational device that simulates earthquakes, comprising:

a flat base;

a flat table disposed above said flat base in vertically spaced apart relation thereto;

a plurality of flexible and resilient interconnecting means disposed in interconnecting relation between said flat base and said flat table for supporting said flat table;

a slot formed in said flat table at a preselected location thereof;

a motor mounted to said flat table adjacent said slot;

said motor having a rotatable output shaft;

a flywheel disposed in said slot and connected to said output shaft so that rotation of said output shaft effects simultaneous and corresponding rotation of said flywheel; and means for mounting said flywheel to said rotatable output shaft for unbalanced rotation so that rotation of said flywheel causes vibration of said table with respect to said base.

3. The educational device of claim 2, further comprising:

said means for mounting said flywheel for unbalanced rotation including a radially extending slot of predetermined extent formed in said flywheel and a weight member selectively positionable at any preselected location along said predetermined extent of said radially extending slot;

whereby an amplitude of vibration created by rotation of said flywheel is a function of the location of said weight member along said predetermined extent of said radially extending slot.

4. The educational device of claim 3, wherein said weight member is formed by a bolt that extends through said radially extending slot and by a nut that screw threadingly engages said bolt to facilitate adjustment of said weight member along said predetermined extent of said radially extending slot and to facilitate use of differing bolts and nuts of differing weights.

5. The educational device of claim 2, wherein said means for mounting said flywheel for unbalanced rotation includes mounting said flywheel eccentrically with respect to said rotatable motor output shaft.

6. The educational device of claim 2, further comprising:

a plurality of mounting holes formed in said table;

at least one strap that overlies said motor;

said at least one strap having opposite ends extending through preselected mounting holes of said plurality of mounting holes;

said opposite ends being secured to one another to firmly retain said motor to said table.

7. The educational device of claim 2, wherein said motor is battery operated so that the device is portable and wherein a battery for providing power to said motor is mounted on said base.

8. The educational device of claim 7, wherein said motor is a variable speed motor so that a vibration rate of said table is adjustable by varying the speed of said variable speed motor.

9. The educational device of claim 8, further comprising control means for controlling the speed of said variable speed motor.

10. The educational device of claim 2, wherein said base is sized larger than said table so that a predetermined part of said base is visible when said educational device is observed in top plan view.

11. The educational device of claim 10, wherein a battery and a motor control means are mounted on said predetermined part of said base that is not disposed below said table to facilitate operator handling of said battery and said control means.

12. The educational device of claim 2, wherein said table has a longitudinal axis of symmetry and wherein said slot is formed in said table coincident with said longitudinal axis of symmetry.

13. The educational device of claim 12, wherein said axis of rotation of said flywheel is disposed at a right angle to the longitudinal axis of symmetry of said table.

14. The educational device of claim 2, wherein said flexible and resilient interconnecting means are coil springs.

* * * * *